Feb. 23, 1965     R. J. BURNISTON     3,170,160
INSULATED "C" RINGS IN COHERENT STRIP FORM
Filed Nov. 14, 1962     2 Sheets-Sheet 1
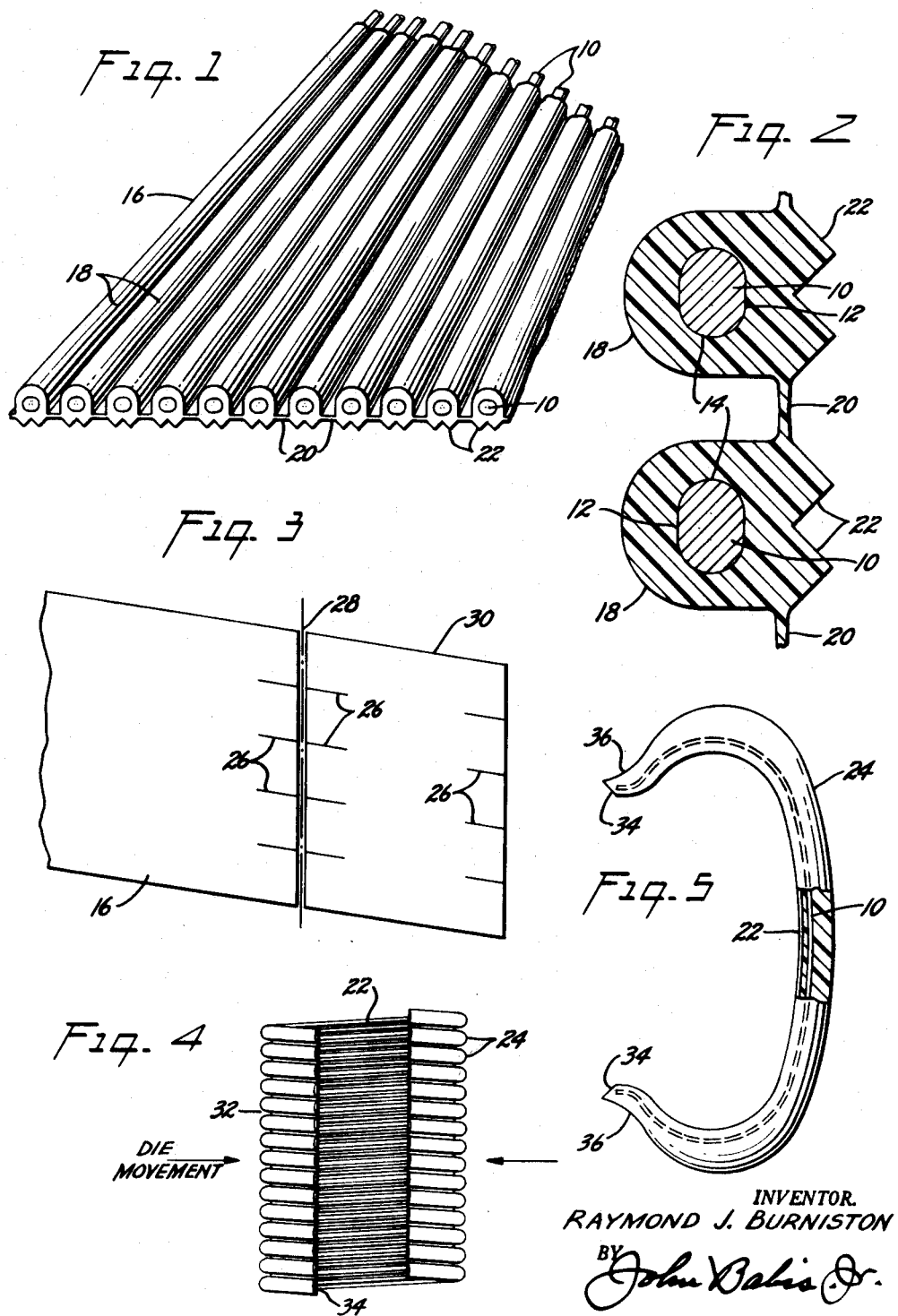
INVENTOR.
RAYMOND J. BURNISTON
BY
ATTORNEY.

INVENTOR.
RAYMOND J. BURNISTON

ATTORNEY.

United States Patent Office 3,170,160
Patented Feb. 23, 1965

3,170,160
INSULATED "C" RINGS IN COHERENT STRIP FORM
Raymond J. Burniston, Old Bridge, N.J., assignor to The Thomas & Betts Co., Incorporated, Elizabeth, N.J., a corporation of New Jersey
Filed Nov. 14, 1962, Ser. No. 237,562
3 Claims. (Cl. 1—56)

The present invention relates to C rings or clips and more particularly to such rings or clips which are formed from tempered steel wire covered or jacketed with a heavy layer of high impact, rigid polyvinylchloride resin plastic for example.

More specifically, the invention resides in the insulated C ring or clip and the method of making the same in coherent strip or stick form particularly adapted for magazine rail loading in power operated hand tools utilizable for feeding and closing or otherwise deforming such insulated C rings or clips singly in succession on and about a plurality of insulated wire conductors arranged in bunched parallelism for example.

Similar insulated staples and "Hog" rings, as known heretofore possessed certain disadvantages in that they were not molded together in stock or strip form; were not partially separated at spaced intervals to permit flexing thereof in the loading of a known type of power actuated hand tool adapted for closing such staples or rings; were not provided with integral means for preventing relative lateral movement thereof when secured on a plurality of bunched articles; were not stable in the use thereof as regards fracturing of the insulation thereon and the protrusion of the ends of the wire core therefrom; and which did not have the holding capacity of the C rings or clips provided by the present invention, or the preformed, closed terminal ends thereof which afford ease of application and the retention thereof on an appropriate bundle of insulated conductors, for example, preparatory to closing each ring or clip thereon with the closed ends of each ring or clip in angularly offset, by-passing relation.

Accordingly, it is an object of the invention to provide an insulated C ring or clip of the character herein described which is not subject to the aforesaid disadvantages.

A further object of the invention is to provide C rings, clips or staples in insulated, coherent strip or stick form and a method of producing the same readily and accurately in large quantities at low cost.

Another object of the invention is to provide insulated C rings or clips in coherent stick or strip form wherein the plastic belt-like enclosure is partially slit transversely at spaced intervals therealong to facilitate placement of such sticks on the loading rail of a power actuated installing tool.

A further object of the invention is to provide insulated C rings in coherent stick form wherein the profile is a one piece ribbon like plastic extrusion having a relatively thin web connecting each C ring in the stick to its adjacent rings whereby the respective rings in each stick are readily separated from each other in the use thereof.

Another object of the invention is to provide insulated C rings in coherent stick form wherein a pair of V ribs integral with each insulated ring are adapted to grip the insulation on wire conductors, for example, and also to prevent cold flow of plastic insulation on such conductors.

With the foregoing and other objects in view, the invention resides in a plastic jacketed or enclosed C ring, clip or staple and the method of molding and forming a plurality of the same in coherent strip or stick form.

Various other objects, advantages and features of the invention will become apparent from the following detailed description when read in connection with the accompanying drawing, in which:

FIGURE 1 is a fragmentary perspective view of a multiple wire strand enclosing, belt like plastic molding produced in predetermined lengths for use in the formation of coherent strip or sticks of insulated wire C rings or clips;

FIGURE 2 is a greatly enlarged fragmentary end view of the belt like plastic molding as seen in FIGURE 1;

FIGURE 3 is a schematic plan view of a fragmentary section of flat, belt like plastic molding illustrating the manner of slitting and cutting off therefrom an end portion of predetermined size at an acute angle to the marginal edges of said plastic molding;

FIGURE 4 is a top plan view illustrating the end portion of the plastic molding cut-off in FIGURE 3 after it has been shifted laterally into a finishing die and its opposite end portions curled into partially closed, coherent stick form with the respective opposite ends of the encased steel wire C rings offset at a predetermined pitch angle;

FIGURE 5 is an enlarged end view in elevation of FIGURE 4, showing the curved, partially closed, flattened free ends of the respective C rings in said coherent stick;

Figure 6:
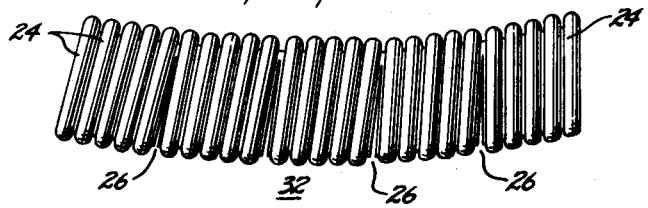
FIGURE 6 is a side elevational view of a coherent stick of C rings illustrating the partial, transverese slits therein at perdetermined intervals therealong.

Referring to the drawings and in accordance with the invention and the method of carrying out the invention, a plurality of lengths or strands of tempered steel wire 10, twenty five for example, having top and bottom flat surfaces 12, and rounded, parallel side margins 14, are passed from a like number of suitably mounted spools or reels, to a like number of guide rollers, not shown, and suitably mounted in the path of and adjacent a multi orifice plastic extruding die, also not shown, wherein each orifice in said die has the interconnected profile, best illustrated in FIGURE 2.

Further in accordance with the invention, each of the herein mentioned guide rollers is disposed in alignment with each of the interconnected orifices in the extrusion die whereby each wire strand 10 may be passed through each orifice axially thereof and in spaced relation thereto due to the profile thereof, by drawing the respective wire strands 10, through the extrusion die, around a drum by means of a plurality of power driven pinch rollers, not shown, between which the free ends of the wire strands 10 are initially extended.

Simultaneously with the wire strand drawing operation, a high impact, rigid, polyvinylchloride for example is extruded through the die in known manner whereby the wire strands 10 are jacketed, inclosed or imbedded in a plastic, belt like structure 16, consisting of a like number of parallel rib or cord like linear members 18, each interconnected with its adjacent members 18, by an intervening, thin plastic web 20, integral therewith. As shown in FIGURE 2, the flat surfaces 12 on each wire strand 10 permit a thicker deposit of plastic thereon in the form of a half round bead on its top flat surface 12, and a pair of spaced, parallel V ribs 22 on its bottom flat surface 12.

In the aforesaid extrusion of the plastic material on the wire strands 10, the flat, belt like structure 16, passing from the discharge side of the die, is passed under a rotatable drum, not shown, in contacting relation therewith, the periphery of the drum being partially immersed in a suitable open, flat, rectangular container of water for cooling and setting the extruded plastic belt like structure 16, which passes therefrom to and between a plurality of power actuated pinch rollers, not shown, whereby the plastic, belt like structure 16 is drawn from the water cooling container and advanced onto a reeling mechanism for winding said belt like structure into suitable size coils.

Further in accordance with the invention, a length of the plastic, belt like structure 16 is fed at an acute angle to a horizontal, linear path, into a multi stage transfer die mounted on a suitable power actuated punch press for slitting, sheering and forming separate portions of said belt like structure 16 into coherent strips or sticks of insulated C rings or clips 24.

In the slitting operation, a portion of the plastic web 20 between each adjacent pair of the cord like linear members 18 of the belt like structure 16 is slit or severed between every fifth and sixth member 18 at spaced points therealong, as indicated at 26, in FIGURE 3, for a purpose presently to be described.

Figure 9:
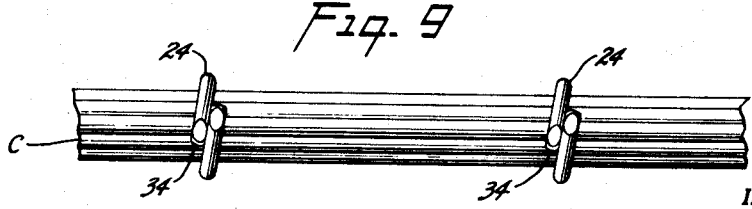
FIGURE 9 is a fragmentary top plan view illustrating a pair of insulated C rings as applied to a plurality of insulated wire conductors arranged in bunched parallelism.

Subsequently, the slitted end portion 26 of the belt like length or section 16 is advanced beyond a suitable cutting blade and cut off midway of the last series of slits 26, as indicated at 28 in FIGURE 3. The severed end portion 30 is then moved laterally to subsequent stations in said transfer die, not shown, where the severed end portion 30 is positioned between two final forming or curling dies which are adapted for movement toward each other and against the opposite ends of each severed end portion 30, positioned therebetween whereby each end portion 30 is formed into a coherent strip or stick 32 of insulated C rings or clips 24 with the respective free ends 34 of the rings or clips offset at a suitable pitch angle, as shown in FIGURE 4. Thus, the offset ends 34 of said C rings or clips 24 are adapted to bypass each other in the use thereof as illustrated in FIGURE 9.

Figure 7:
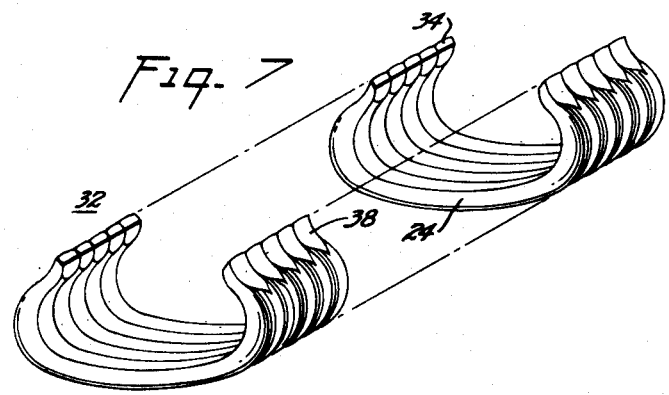
FIGURE 7 is a perspective view of a strip or stick of coherent C rings after their free ends have been reversely curved.
Figure 8:
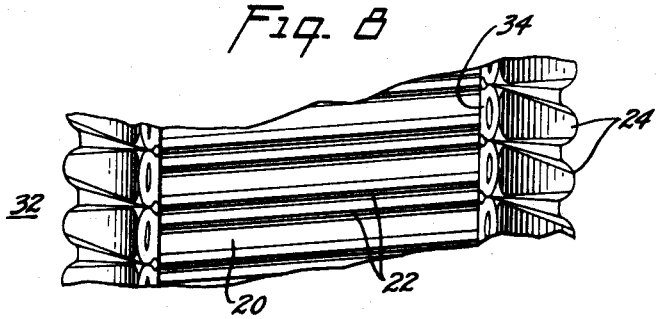
FIGURE 8 is a greatly enlarged fragmentary plan view of a coherent stick of C rings illustrating the relationship of each individual ring or clip in the stick to its adjacent C rings.

In the formation of each severed end portion 30 into a coherent strip or stick 32 of C rings or clips 24, the respective offset free ends 34 thereof are reversely curved, as at 36, to provide smooth entrance lips thereon, in which operation the opposite ends of the plastic jacket are substantially flattened on the outer side thereof, as best shown at 38, in FIGURE 7. At the same time, the plastic material on the reversely curved end portion of said rings or clips 24 is thereby deformed and caused to creep or cold flow substantially beyond the free ends of the enclosed bare wire core whereby the bare end faces of said wire core become recessed within their respective plastic jacket. Thus, the free ends 34 of each C ring or clip 24 are adapted to be readily passed over and around articles such as a plurality of insulated wire conductors C, for example, disposed in bunched parallelism without injury to the insulation thereon.

As previously described in connection with FIGURE 6, the series of slits 26 formed at spaced points along the belt like structure 16 provide a partial separation between the respective free end portions of every fifth and sixth insulated C ring or clip 24, in a coherent strip or stick 32 thereof, whereby such strips or sticks are adapted to flex and are free to substantially follow the contour of a known form of loading rail in a power actuated installing tool. The remaining plastic connection between each and every insulated C ring or clip 24, in a coherent strip or stick 32 thereof, is severed in the successive feeding of each individual C ring from the stick to the jaws of the installing tool.

While the invention has been illustrated and described with respect to several embodiments thereof, it is to be expressly understood that various changes and modifications may be made therein without departing from the inventive concept underlying the same. Therefore, the herein described invention is not to be limited except as is necessitated by the prior art and the scope of the appended claims.

What is claimed is:

1. A coherent stick of insulated C rings comprising a belt like length of extruded high impact, rigid polyvinylchloride plastic presenting a plurality of spaced, parallel members interconnected with a relatively thin plastic web therebetween, each of said members including an arcuate upper side, a ribbed lower side including a pair of V-ribs extending lengthwise of said member on its lower side, each of said members further including a steel wire core having opposite flat surfaces and semi-circular margins, said belt like section having parallel opposite ends formed at an acute angle to its parallel side margins and deformed toward each other in parallelism whereby the ends of said members are offset at an angle and the end faces of each of the respective wire cores in each of said members is recessed within the ends of the plastic thereon, the curved ends of said members being reversely curved to provide a smooth lip on the inner side each C ring in said coherent stick.

2. A series of insulated C rings in interconnected stick form comprising a belt like section of extruded plastic encasing and interconnecting a plurality of spaced, parellel, linear members, each member including a semi-circular top side, a ribbed lower side including a pair of V-ribs extending lengthwise thereof on said lower side, said linear members each being interconnected to adjacent members with a relatively thin plastic web extending therebetween and a linear wire member including upper and lower planar surfaces and semi-circular margins, said belt like section including parallel opposite ends formed at an acute angle to its side margins and deformed toward each other in parallelism whereby the ends of said linear members are offset at a small pitch angle and the free end faces of said wire member recessed within the ends of the extruded plastic thereon, said ends of said linear members being reversely curved to provide a smooth lip on the inner side thereof.

3. A series of insulated C rings in interconnected stick form comprising a belt like section of extruded plastic encasing and interconnecting a plurality of spaced, parallel, linear members each having a semi-circular top side, ribbed lower side and a least one V-rib extending lengthwise thereof on its lower side, said linear members being interconnected with a relatively thin plastic web therebetween and each linear member including a steel wire core having opposite flat surfaces and semi-circular margins, said belt like section having parallel opposite ends formed at an acute angle to its side margins and deformed toward each other in parallelism whereby the ends of said linear members are offset at a small pitch angle and the free end faces of said wire cores recessed within the ends of the extruded plastic thereon, the said opposite ends of said linear members being reversely curved to provide a smooth lip on the inner side thereof, the plastic web interconnecting said linear members including means defining an inwardly directed slit extending between the end portions of selected linear members to permit arcuate flexing of said coherent stick of C rings.

References Cited in the file of this patent

UNITED STATES PATENTS

| | | |
|---|---|---|
| 862,475 | Haywood | Aug. 6, 1907 |
| 2,471,752 | Sngmanson | May 31, 1949 |
| 2,526,902 | Rublee | Oct. 24, 1950 |
| 2,743,445 | Lerner | May 1, 1956 |
| 3,022,511 | Macy | Feb. 27, 1962 |
| 3,076,373 | Matthews | Feb. 5, 1963 |
| 3,078,533 | Allen | Feb. 26, 1963 |
| 3,082,425 | Leslie | Mar. 26, 1963 |
| 3,085,129 | Anderson | Apr. 9, 1963 |

FOREIGN PATENTS

| | | |
|---|---|---|
| 806,988 | Great Britain | Jan. 7, 1959 |